US010845235B2

(12) United States Patent
McNeally et al.

(10) Patent No.: US 10,845,235 B2
(45) Date of Patent: Nov. 24, 2020

(54) CARTS WITH AN INTEGRATED WEIGHING SYSTEM FOR WEIGHING ITEMS PLACED IN THE CARTS

(71) Applicant: Blynk Technology, Portland, ME (US)

(72) Inventors: Allegra A. McNeally, Scarborough, ME (US); M. Alamgir Tamoori, Lahore (PK); Daniel Shahzad Kirmani, Scarborough, ME (US); Gabriel Shahzad Kirmani, Scarborough, ME (US)

( * ) Notice: Subject to any disclaimer, the term of this patent is extended or adjusted under 35 U.S.C. 154(b) by 234 days.

(21) Appl. No.: 16/197,509

(22) Filed: Nov. 21, 2018

(65) Prior Publication Data
US 2019/0154492 A1 May 23, 2019

Related U.S. Application Data

(60) Provisional application No. 62/590,105, filed on Nov. 22, 2017.

(51) Int. Cl.
*G01G 19/12* (2006.01)
*G01G 19/414* (2006.01)
*B62B 3/14* (2006.01)
*B62B 5/00* (2006.01)

(52) U.S. Cl.
CPC .......... *G01G 19/12* (2013.01); *B62B 3/1424* (2013.01); *B62B 5/0096* (2013.01); *G01G 19/4144* (2013.01); *B62B 2203/50* (2013.01)

(58) Field of Classification Search
CPC .... G01G 19/12; G01G 19/4144; G01G 21/23; G01G 19/52; B65B 3/1424; B65B 5/096; B65B 2203/50
See application file for complete search history.

(56) References Cited

U.S. PATENT DOCUMENTS

| 2,813,709 | A | * | 11/1957 | Brier | G01G 3/142 177/137 |
| 4,071,740 | A | | 1/1978 | Gogulski | |
| 5,714,695 | A | * | 2/1998 | Bruns | G01L 1/042 177/136 |
| 5,831,221 | A | * | 11/1998 | Geringer | G01G 19/52 177/144 |
| 6,484,359 | B1 | * | 11/2002 | Guttmann | B60B 33/045 16/18 R |

(Continued)

FOREIGN PATENT DOCUMENTS

| CN | 201520317 U | 7/2010 |
| CN | 202016491 U | 10/2011 |

(Continued)

OTHER PUBLICATIONS

Lauzon et al, "Point of Sale Grocery Cart," Michigan State Univeristy, ECE 480, Team 6, Fall 2014, 69 pgs.

(Continued)

*Primary Examiner* — Randy W Gibson
(74) *Attorney, Agent, or Firm* — Michael A. Rodriguez

(57) ABSTRACT

A weight system includes a cart comprising a plurality of wheels and a frame on the plurality of wheels. The frame has a plurality of rails, and a basket is suspended from the plurality of rails of the frame. A weight sensor is coupled at one end to the suspended basket and attached at another end to one of the plurality of rails of the frame from which the basket is suspended. The weight sensor is adapted to detect weight change of the basket when an item is placed into or removed from the basket.

19 Claims, 6 Drawing Sheets

(56) References Cited

U.S. PATENT DOCUMENTS

| | | | |
|---|---|---|---|
| 6,539,578 B1 * | 4/2003 | Guttmann | B60B 33/0018 16/44 |
| 6,725,206 B1 | 4/2004 | Coveley | |
| 8,464,945 B2 | 6/2013 | Connelly | |
| 9,230,249 B1 | 1/2016 | Vora | |
| 9,607,486 B2 | 3/2017 | Acker et al. | |
| 10,600,043 B2 * | 3/2020 | Chaubard | G06N 3/0454 |
| 10,769,713 B1 * | 9/2020 | Townsend | G01G 19/52 |
| 2009/0228363 A1 | 9/2009 | Segev | |
| 2012/0284132 A1 * | 11/2012 | Kim | G06Q 20/18 705/20 |
| 2014/0214596 A1 | 7/2014 | Acker et al. | |
| 2015/0206121 A1 | 7/2015 | Joseph et al. | |
| 2018/0218351 A1 * | 8/2018 | Chaubard | H04N 7/181 |

FOREIGN PATENT DOCUMENTS

| | | |
|---|---|---|
| CN | 202320439 U | 7/2012 |
| CN | 203268094 U | 11/2013 |
| CN | 203805932 U | 9/2014 |
| CN | 105083354 A | 11/2015 |
| CN | 205113398 U | 3/2016 |
| CN | 106515806 U | 3/2017 |
| CN | 106915372 A | 7/2017 |
| DE | 19643122 A1 | 4/1998 |
| DE | 102011081330 A1 | 2/2012 |
| ES | 2102311 B1 | 3/1998 |
| JP | H0818558 B2 | 2/1996 |
| JP | 3092357 U | 12/2002 |
| JP | 2007034789 A | 2/2007 |
| NL | 1030836 C1 | 2/2006 |
| WO | 0073971 A1 | 12/2000 |

OTHER PUBLICATIONS

Woodruff, "Watch a Demo of Whole Food's Eerily Smart Motorized Grocery Cart", Business Insider, businessinsider.com, Mar. 2, 2012.

"Smart Cart Shopping Basket", hackathon.io, accessed: Oct. 2017.

* cited by examiner

CARTS WITH AN INTEGRATED WEIGHING SYSTEM FOR WEIGHING ITEMS PLACED IN THE CARTS

RELATED APPLICATION

This application claims the benefit of and priority to U.S. Provisional Application No. 62/590,105 titled "Scale Integrated into Cart," filed on Nov. 22, 2017, the entirety of which provisional application is incorporated by reference herein for all purposes.

FIELD OF THE INVENTION

The invention relates generally to item-collection carts. More particularly, the invention relates to such carts having an integrated weighing system for weighing items placed in the carts.

BACKGROUND

Current shopping carts have fixed or, less commonly, removable baskets to hold items for purchase. Rarer still are carts that have a flat tray or plane upon which items to be weighed are placed that functions as a scale in the bottom of the cart basket. Such shopping carts are unable to weigh items accurately, either because they lack a scale or because, if the scale is at the bottom of the basket, items that lean against the side of the basket are weighed inaccurately. Further, it is common that many jurisdictions have laws restricting the use of scales in commerce to those that can be verified as repeatably accurate by a public weighmaster; so reliably accurate weight measurements are paramount.

SUMMARY

All examples and features mentioned below can be combined in any technically feasible way.

In one aspect, the invention relates to a weighing system comprising a cart having a plurality of wheels and a frame on the plurality of wheels. The frame has a plurality of rails. The cart further comprises a basket that is suspended from the plurality of rails of the frame and a weight sensor that is coupled at one end to the suspended basket and attached at another end to one of the plurality of rails of the frame from which the basket is suspended. The weight sensor is adapted to detect a weight change of the basket when an item is placed into or removed from the basket.

In one embodiment, the weighing system further comprises a computing device in communication with the weight sensor to receive therefrom information related to the weight change of the basket detected by the weight sensor. The computing device has a processor configured to compute the change in weight of the basket in response to the information. The weighing system may further comprise a display screen and the computing device is configured to display weight information on the display screen in response to receiving the information related to the weight change of the basket detected by the weight sensor.

The weight sensor may be disposed within the frame. A first end of the weight sensor may be fixed to the frame and a second end of the weight sensor free-floating and coupled to the suspended basket.

The frame of the cart may comprise at least one forward vertical support post. In another embodiment, the weighing system further comprises attachment means having a first end coupled to the suspended basket and a second end coupled to the weight sensor, thereby to couple the weight sensor to the basket. The weighing system may further comprise a second weight sensor coupled to the suspended basket and attached to a second one of the rails of the frame from which the basket is suspended.

The weighing system may further comprise one or more optical sensors with a field of view that covers the basket and a computing device in communication with the one or more optical sensors. The computing device has a processor configured to receive image or video data from the one or more optical sensors and to identify an item placed in the basket.

In another aspect, the invention relates to a weighing system comprising a mobile weighing scale having a plurality of wheels, a frame on the plurality of wheels, a basket, for holding items therein, supported by the frame, and one or more weight sensors. Each weight sensor of the one or more weight sensors is fixed between a bottom portion of the frame and a different one of the plurality of wheels. The one or more weight sensors is adapted to detect weight change of the basket when an item is placed into or removed from the basket.

The weighing system may further comprise a computing device in communication with the one or more weight sensors to receive therefrom information related to the weight change of the basket detected by the one or more weight sensors. The computing device has a processor configured to compute the change in weight of the basket in response to the information. The computing device may also be configured to display a weight information on a display screen in response to receiving the information related to weight change detected by the one or more weight sensors.

In one embodiment, the frame has a base and a plurality of vertical posts supporting the base, and each weight sensor has a first end and a second end opposite the first end. The first end of each weight sensor is attached to a different one of the plurality of wheels, and the second end of each weight sensor is attached to a bottom of a different one of the vertical posts of the frame.

In one embodiment of the weighing system, the frame comprises at least one forward vertical support post. The basket may sit directly on the base of the frame. In another embodiment, the frame comprises rails, and the basket suspends from the rails of the frame, and the weighing scale further comprises a second set of one or more weight sensors attached to the rails of the frame from which the basket suspends, and wherein the second set of one or more weight sensors is coupled to the suspended basket to detect a weight change of the basket.

The weighing system may further comprise a plurality of optical sensors with fields of view that cover all or a portion of the basket, and the computing device may be configured to receive image or video data from the plurality of optical sensors and to identify an item placed in the basket.

In another aspect, the invention is related to a weighing system comprising a cart having a plurality of wheels and a frame on the plurality of wheels. The frame has spaced apart vertical members. Each vertical member has one or more shelves extending horizontally therefrom. A shelf of the one or more shelves of a first vertical member directly opposes a shelf of the one or more shelves of a second vertical member. The weighing system further comprises a weight sensor attached to a top surface of each of the opposing shelves and a floating rail attached to a top surface of each weight sensor, wherein the weight sensors are adapted to detect weight change in a container sitting on the floating rails when an item is placed into or removed from the container. The weight sensors are adapted to detect weight change in a container sitting on the floating rails when an item is placed into or removed from the container.

In one embodiment the weighing system further comprises a computing device attached to the frame and in communication with each weight sensor to receive therefrom information related to a change in weight detected by the weight sensors. The computing device has a processor configured to calculate a change in weight of the container in response to the information received from the weight sensors.

The weighing system may further comprise a second weight sensor. The second weight sensor is fixed between a bottom portion of the frame and one of the plurality of wheels.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Weighing systems described herein allows items to be weighed accurately as they are placed in a cart (e.g., a container), such as a retail shopping cart, although the cart itself can be used for other purposes, for instance, holding picked items in a warehouse environment. Such weighing systems achieve precise weighing of each item placed in the cart by having the basket, the entire cart, or both as part of the scale. Conscious involvement of the shopper in the weighing of such items is unnecessary. Combined with an object identification system, the ability to know the weight of each item, and the total weight of all items, in a shopping basket and/or cart reveals if all items in the cart have been correctly identified. For example, this knowledge allows a retail shopper to be charged correctly for items placed in the shopping cart or allows a picker in a warehouse to verify that all items on a picking list have been picked.

Figure 1:
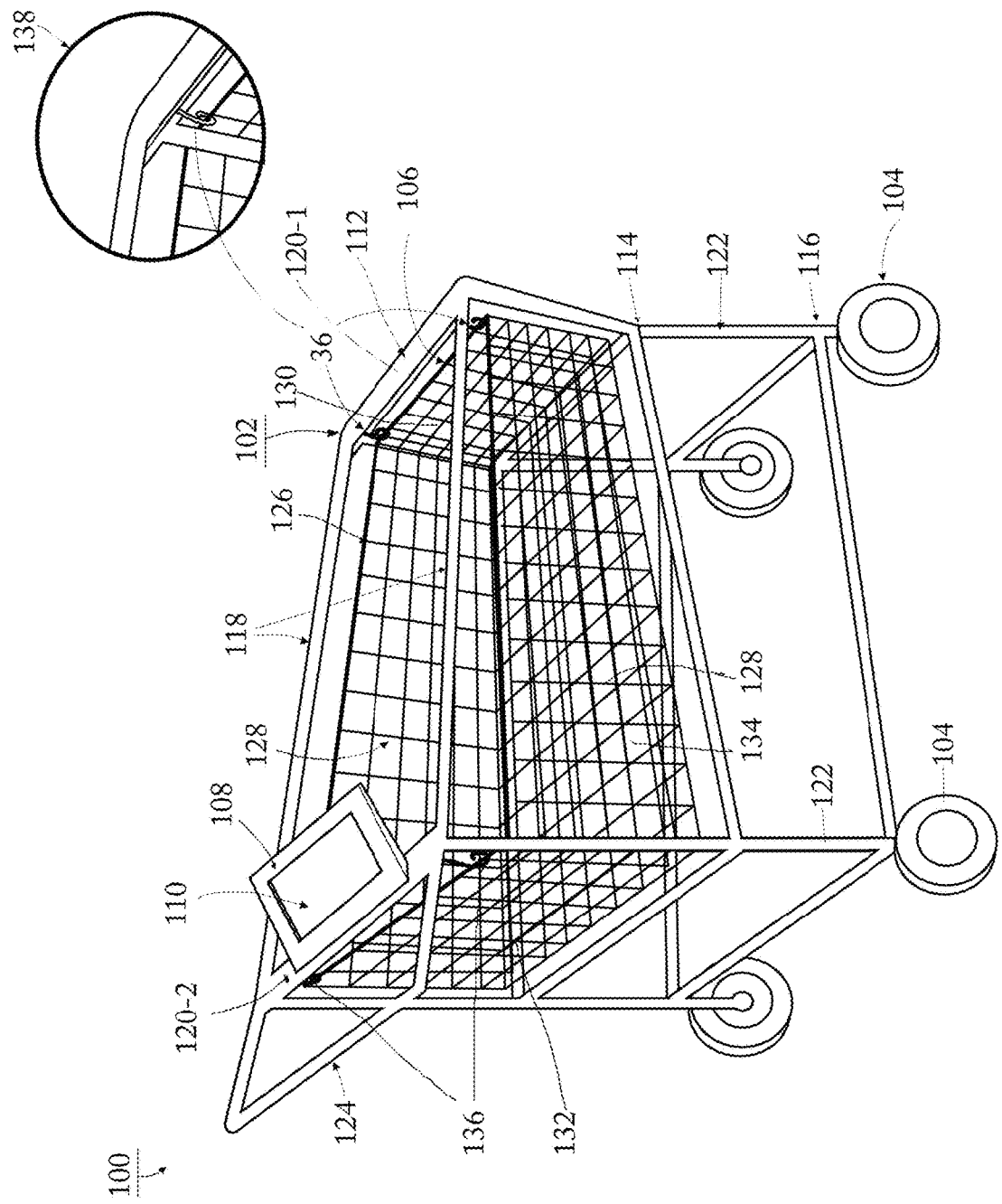
FIG. 1 is a side view of an embodiment of a cart with an integrated weight scale.

FIG. 1 shows an embodiment of a shopping cart 100 having a frame 102 on wheels 104, a suspended basket 106, and an electronic computing device 108 with a display screen 110. The construction of the shopping cart may be made of metal, plastic, or a combination thereof and/or of other materials, for example wood. The principles described herein extend to other examples of carts, which include, but are not limited to, carriages, carriers, trolleys, buggies, picker cart, grocery carts, and supermarket carts.

The frame 102 of this embodiment of shopping cart 100 has a framework with three tiers, referred to, for purposes of aiding the description, as a top tier 112, mid-tier or base 114, and bottom tier 116. The framework also comprises opposing side rails 118 and opposing cross rails 120. The three tiers are connected by substantially vertical support posts 122. The forward vertical support posts 122 at the front end of the cart 100 adds rigidity to the frame 102; and because any flexibility in the frame can have a negative effect upon of weighing accuracy, this enhancement to frame stability improves the accuracy of the weighing of items placed in the suspended basket 106.

Each of the three tiers of the frame 102 has a substantially horizontal rectangular or trapezoidal shape (other embodiments can have different shapes, for example, oval or circular). A shopper places items into or removes items from the basket 106 through the top tier 112. The side rails and cross rails of the mid-tier or base 114 are at an intermediate height of the frame. The bottom tier 116 is just above the wheels 104. The opposing cross rails 120 of the top tier 112 has a front cross rail 120-1 and a back cross rail 120-2. Extending rearward from the back cross rail 120-2 is a handle 124 by which a person can grasp and move the shopping cart 100. The rails 118, 120 do not need to be parallel or level. Whereas having level top rails 118, 120 or a level bottom of the suspended basket, that is parallel to a flat floor, facilitates the location triangulation of an item in the basket (described below in more detail), being level is not necessary for an accurate weight reading. Gravity pulls down the suspended basket, regardless of the basket's shape and regardless of whether the hanging hooks are at an even height with each other.

The wheels 104 of the shopping cart can be caster wheels, of the swivel or rigid variety. For example, the front two wheels can be swivel, while the rear two wheels are rigid. Alternatively, all four wheels can be rigid, or all four wheels can be swivel. Although the shopping cart 100 has four wheels, one wheel at each corner of the cart, in other embodiments, the cart may have three wheels: one in the front and two in the back.

The basket 106 is in this embodiment a lattice, having a top edge 126, opposing side walls 128, a front wall 130, a back wall 132, and a bottom tray 134. Alternatively, the basket can have any pattern, including a solid plastic bin, provided the basket has holes or an edge or other means to receive weighing hooks or other attachment means by which to suspend the basket. The basket may also be referred to as a bin, container, or holder. Weighing hooks 136, also referred to broadly as attachment means, pass through the mesh of the basket 106 nearest its top edge 126. If the basket is rigid enough so as not to flex under the weight of items placed onto its bottom tray 134, the hooks can pass through the basket's mesh at a point or points lower in the walls 128, 130, 132 than at the top edge 126. The basket 106 hangs suspended from the frame 102 by these hooks 136 (also referred to as suspension points). In the embodiment shown, there are four such hooks 136, one at each corner of the basket 106. Other embodiments have two hooks instead of four: one on the front wall 130 and the second on the back wall 132, or one on each of the two opposing side walls 128. One end of each hook 136 is attached to a weight sensor (not shown) that is fixed to the frame 102. A detail view circle 138 shows an example location of one of the weight sensors on or in the frame 102.

The electronic computing device 108 with the display screen 110 is attached to the rear cross rail 120-2, arranged such that the display screen 110 faces a person who is behind the shopping cart 100. The display screen 110 may be situated on a gimbal (not shown) that allows for manual rotation of the screen 110 for viewing suited to the person behind the cart. The electronic computing device 108 is in communication with each of the weight sensors to receive information therefrom related to weight measurements and may have wireless communication capabilities (e.g., Bluetooth®, Wi-Fi, radio frequency (RF) or radio signals) for communicating with wireless access points located within an enterprise, such as a grocery store or warehouse. The electronic computing device 108 may be embedded within the rear cross rail 120-2, not visible to the person using the cart. The electronic device 108 includes a processor (not shown) and memory (not shown); the processor is programmed to record each successive detected weight change in the basket 106 and, optionally, to display the amount of weight added to the cart and the total weight in the cart on the display screen 110. The location of the computing device 108 on the frame of the cart is an illustrative example; in another embodiment, the computing device can reside remotely (e.g., hand held by an operator using, for example, a hand-held UPC scanner or a cell phone), and the weight sensors can communicate with the computing device wirelessly (e.g., BLUETOOTH®, Wi-Fi, radio signals).

Other embodiments of the shopping cart can have a second suspended basket (not shown) that hangs below the basket 106 from side rails or cross rails of the frame's mid-tier 114 by hooks that are coupled at one end to a weight sensor fixed to the frame 102. The electronic device 108 in such embodiments is also in communication with these weight sensors to receive information related to weight measurements corresponding to items placed in the second basket. Alternatively, instead of a single suspended basket 106 hanging from the top tier 112 of the frame 102, other embodiments of the shopping cart 100 can have multiple suspended baskets hanging from the top tier 112, side by side, each operating as a separate scale upon which to weigh items placed into that basket.

Another embodiment of the shopping cart 100 can have a machine-vision system comprised of one or more optical sensors (video cameras) having a field of view that covers all or a portion of the basket 106. Each optical sensor is in communication with the electronic device 108 to transmit image or video data thereto. The processor (not shown) of the electronic device is programmed to perform image processing on the image or video data, to identify an item that has been placed in the basket. The location of the item in the basket, for purposes of directing and focusing the optical sensors on the item, and thereby capturing a quality image of the item, can be acquired through weight triangulation, described in more detail in connection with FIG. 2.

Figure 2:
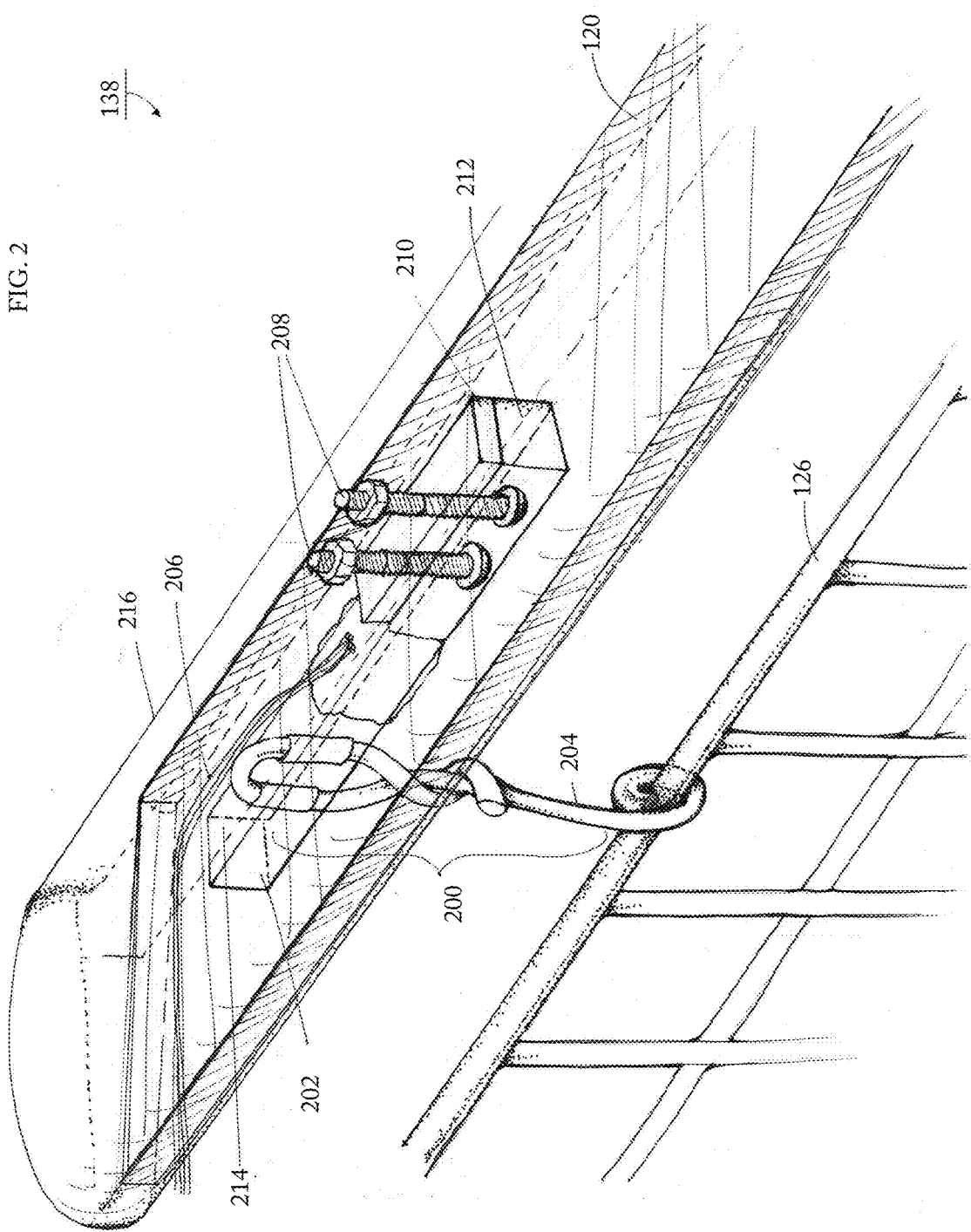
FIG. 2 is a detail view of an embodiment of mechanism for attaching a weight sensor to the frame of the shopping cart.

FIG. 2 shows the detail view 138 (FIG. 1) of an embodiment of mechanism 200 for both attaching a weight sensor to the frame 102 of the shopping cart and suspending the basket 106 from the weight sensor and, thus, from the frame 102. The mechanism 200, embodied within a cross rail 120 or side rail 118 of the frame 102, is implemented at each location of the frame 102 wherever a weight sensor is desired, depending upon the embodiment of the shopping cart 100. For example, an embodiment with four weight sensors, one at each corner of the cart, has four such mechanisms.

The mechanism 200 includes a weight sensor 202, a wire hook 204, wires 206, one or more fasteners 208 (a plurality shown), and, if needed, a shim 210. In this embodiment, the weight sensor 202 is a parallel beam load cell weight weighing sensor. An example of a load cell weight weighing sensor suitable for the above-described application is the TAL220 parallel beam load cell, manufactured by HT Sensor Technology Co., Ltd. of Xi'an P.R. China. Other types of weight sensors, such as weight transducers, force sensors, piezoelectric sensor, load cells, load sensors, and strain gauges, which are all encompassed herein by the term "weight sensor", can be employed without departing from the principles described herein.

One end 212 of the weight sensor 202 is fixed to the frame 102, attached thereto by the fasteners 208. The shim 210 can fill any space between the weight sensor 202 and the frame 102. The opposite end 214 of the weight sensor 202 is free-floating, that is, it is unattached to the frame 102. The wire hook 204 couples to the weight sensor 202 at its free-floating end 214. The shim 210 operates to separate the weight sensor 202 from the frame 102 so the opposite end 214 of the weight sensor is free-floating and to provide clearance for the wire hook 204 at that end where the wire hook 204 threads two holes. The other end of the wire hook 204 is securely fastened to the mesh at the top edge 126 of the basket 106. The weight of the hanging basket 106 and any items placed therein pull the free-floating end 214 of weight sensor 202 downwards. The wires 206, which pass through the frame 102 to the electronic device 108, transmit the difference in flex of the weight sensor 202 (i.e., the weight change) thereto. For example, where the weight sensor is a parallel beam load cell, as described previously, the wires 206 are in communication with the load cell's four strain gauges that are arranged in a Wheatstone bridge. The load cell measures electrical resistance, which changes proportionally in response to the strain applied to the load cell and translates the measurement into an electrical signal indicative of a weight measurement. A protective bumper 216 covers the frame 102 and the fasteners 208 that project through the frame 202, thus protecting the mechanism 200 housed therein. Although shown in FIG. 2 to be internal to the frame 102, the attachment mechanism 200 can alternatively be attached externally to the frame 102 (e.g., on an under-surface of a cross rail or side rail).

During operation of the cart, the weighing system initially zeroes out the weight of the basket: the basket is considered the tare weight and not to be measured. When an item is put into the basket, each weight sensor registers the difference, and the computing device combines (i.e., sums) the amounts from each weight sensor to determine the total weight of the item placed in the basket. For example, if the cart has four weight sensors, one weight sensor at each corner of the basket, and if one sensor measures 800 g, a second sensor measures 150 g, a third sensor measures 32 g and a fourth sensor measures 18 g, then the item placed in the cart weighs 1 kg. The computing device records the measured weight and optionally displays the weight amount just added to the basket and/or the total weight in the basket on the display screen. Further, if the cart has three or more weight sensors, the computing device can triangulate the location of the item placed in the basket from the weight changes measured by each sensor. Knowing where an item is placed in the scale basket is valuable information for those embodiments having an integrated machine-vision system to identify items placed in the cart. Knowing the location of the item from weight triangulation allows the optical sensors to be directed toward and focused on the item most recently placed in the basket scale.

Figure 3:
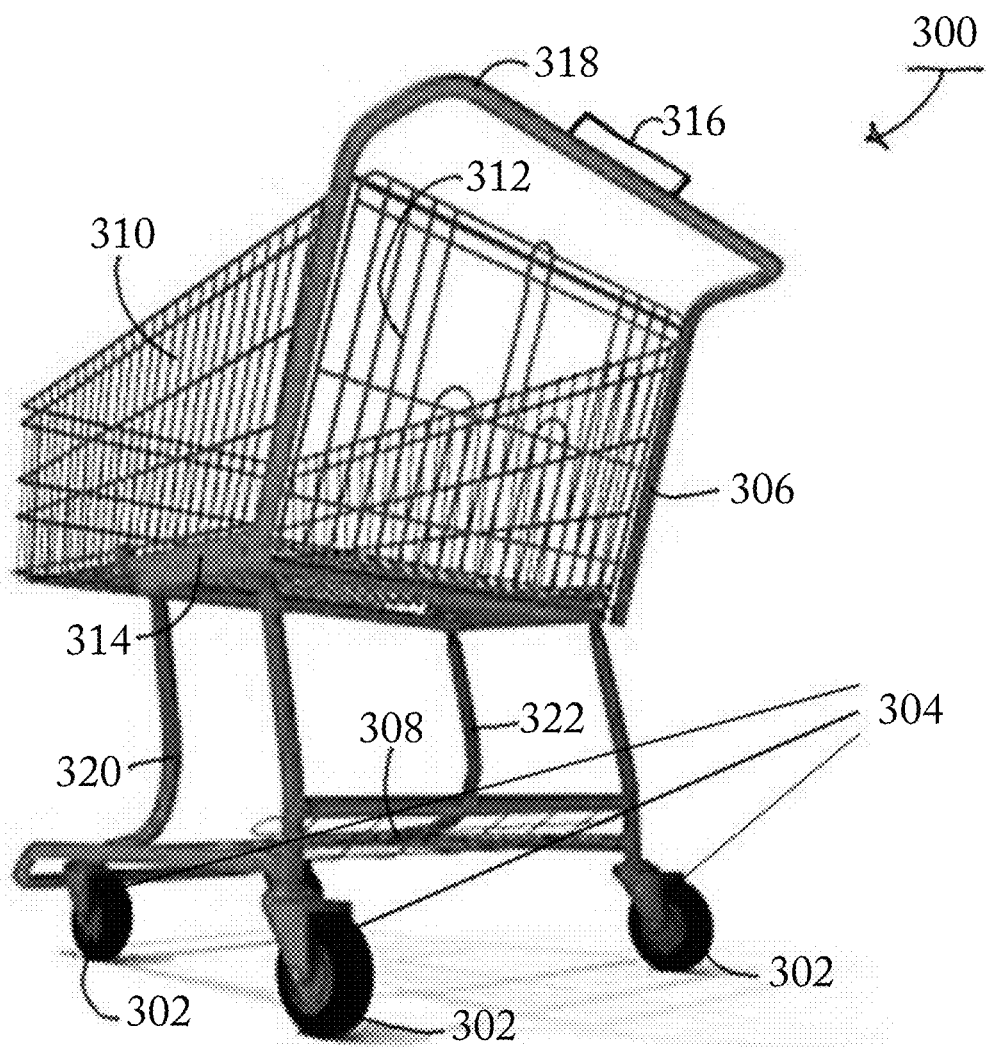
FIG. 3 is a side view of another embodiment of a cart with an integrated weight scale.

FIG. 3 shows another embodiment of a shopping cart 300 with an integrated weighing system. In this embodiment, almost the entirety of the shopping cart itself operates as the scale for weighing items placed inside. For accurate weighing of such items, a weight sensor is placed near each wheel 302. As shown, the shopping cart 300 has three wheels 302—two wheels in the back corners, one wheel in the front center—and has three weight sensors disposed at locations 304 just above the wheels 302. For a shopping cart with four wheels, for example, like the shopping cart 100 of FIG. 1, there are four weight sensors, one weight sensor near and just above each wheel.

This implementation of an integrated weighting system can be applied to shopping carts that have conventional features, namely, a frame 306 supporting a lower shelf 308 and a cantilevered basket 310 with a upwardly folding rear side 312 that enables the carts to nest within each other (for purposes of storing the carts or for moving multiple carts together at one time) and a child seat (not shown). The frame 306 includes a rectangular base 314 (here, e.g., an assembly of cross rails and side rails) that resides immediately below the basket 310 and directly supports the basket's weight. Having the weight sensors disposed just below the lower shelf 308 and just above the wheels 302 enables the weighing of items placed on the lower shelf 308 in addition to those items placed into the basket 310. The tare weight includes the entirety of shopping cart above the wheels, including any child in the child seat or any items, such as purses, shopping bags, placed initially into the cart before shopping begins. An electronic computing device 316 can be configured to measure and zero out this initial weight. The electronic device 316 can be mounted to a handle 318 of the frame 306 or to an upper frame cross rail (not shown). Alternatively, the electronic computing device 316 can reside remotely (e.g., hand held by an operator using, for example, a hand-held UPC scanner or a cell phone), and the weight sensors can communicate with the computing device wirelessly (e.g., BLUETOOTH®, Wi-Fi, radio signals). Optionally, the frame 306 has one or more forward vertical supports 320 to stabilize the cantilevered basket 310 and thereby improve the accuracy of weight measurements.

Figure 4:
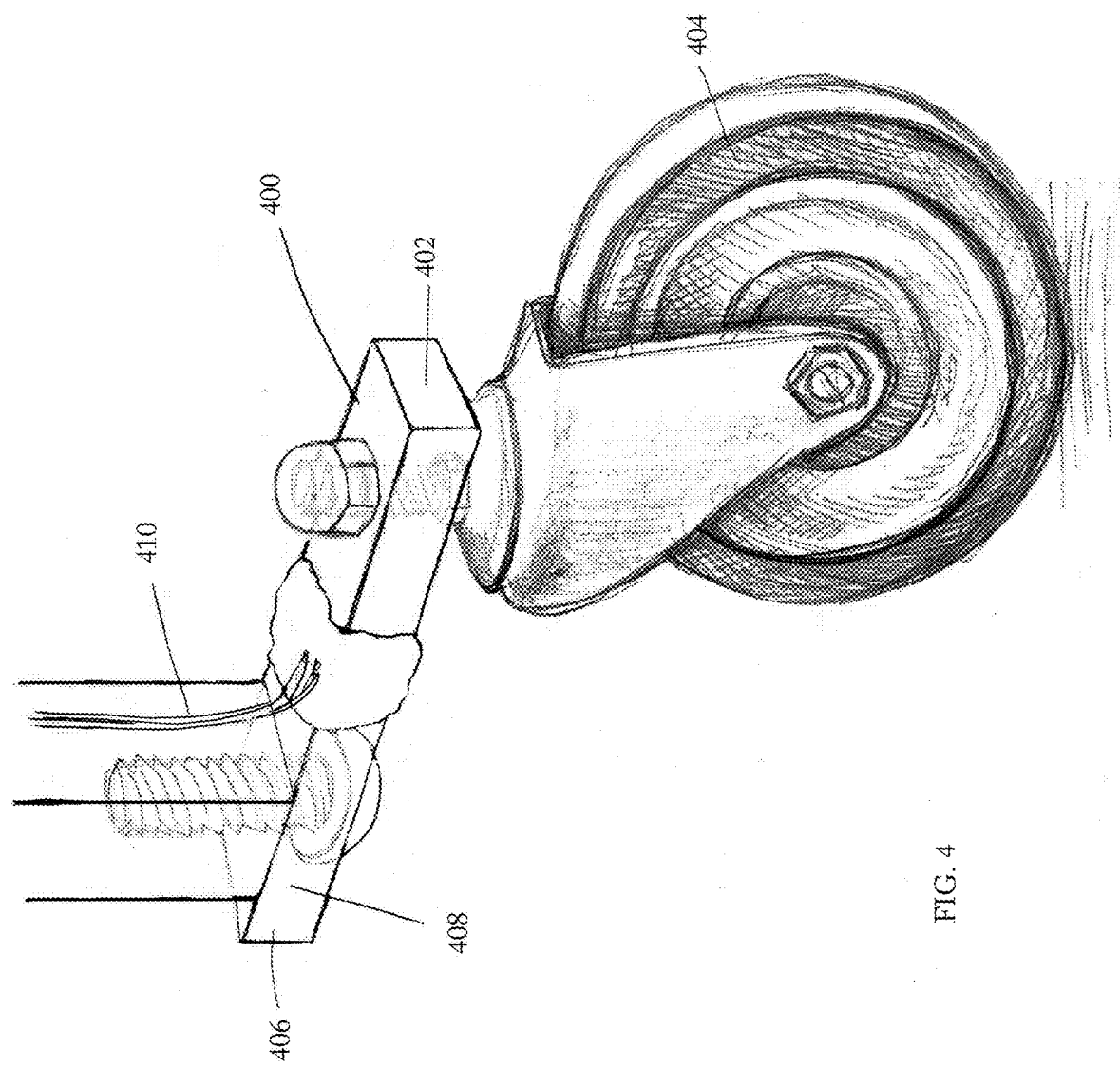
FIG. 4 is a diagram of an embodiment of a wheel sensor used in the shopping cart of FIG. 3.

FIG. 4 shows an embodiment of a weighing system integrated into a shopping cart, such as the shopping cart 300 of FIG. 3 (with some modification to its wheel region). In this embodiment, a weight sensor is integrated into the shopping cart near each wheel of the cart. The weight of the entire cart (excepting the wheels) rests on these weight sensors. In effect, the shopping cart has become a scale for weighing items placed inside (the cart itself being considered the tare weight). In the embodiment shown, a weight sensor 400, like the one described in connection with FIG. 2, is firmly attached (e.g., bolted) at one end 402 to a caster wheel 404 of the shopping cart. The opposite end 406 of the weight sensor 400 is firmly attached to a vertical post 408 of the cart's frame. Wires 410 of the weight sensor 400 run along (internally or externally) the post 408 and connect to the electronic device 108 (FIG. 1). The wires 410 relay information regarding flex of the weight sensor 400 caused by the weight of items placed into or onto the cart.

A machine-vision system, like that described in connection with FIG. 1, can be integrated into the shopping cart, for determining the identity of an item that has been placed in the cart. Further, embodiments of the shopping cart with an integrated weighing system can be a combination of weight sensors coupled to a suspended basket, as described in connection with FIG. 1 and FIG. 2, and weight sensors located at the wheels of cart, as described in connection with FIG. 3 and FIG. 4. Weight change sensed by the upper weight sensors (i.e., those in the frame coupled to the suspended basket) can be compared to weight change sensed by the lower weight sensors (i.e., those located near the wheels). A weight change detected by both the upper and lower weight sensors should be comparably the same (that is, the weight of an item put in the basket should be sensed by both groups of weight sensors). A weight change detected by the lower weight sensors but not by the upper weight sensors would signify that an item has been placed on the cart elsewhere other than in the basket (e.g., on the lower shelf).

Figure 5:
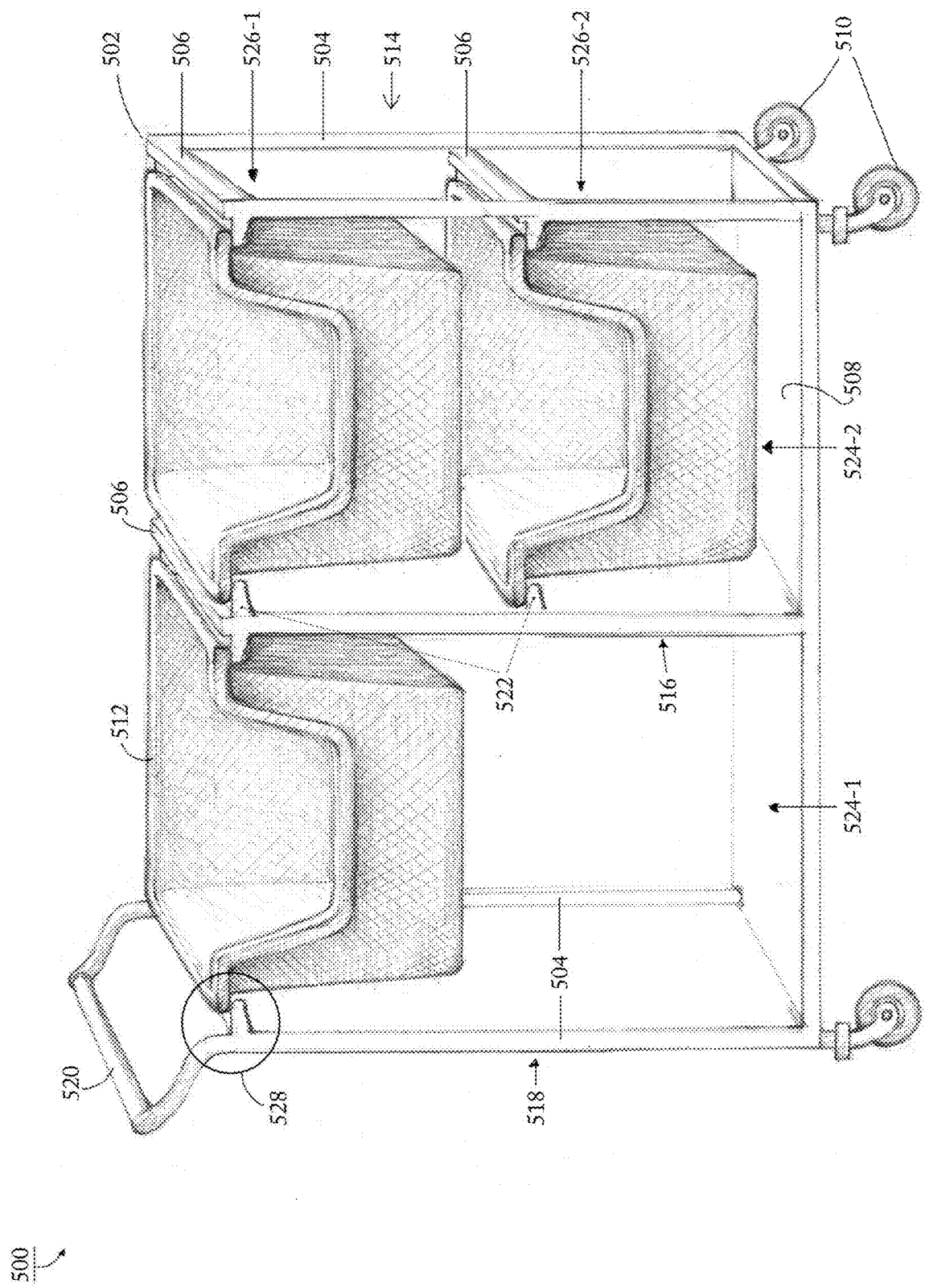
FIG. 5 is a three-quarter view of another embodiment of a cart with an integrated weight scale.

FIG. 5 shows another embodiment of a cart 500 with an integrated weighing system. The construction of the cart 500 may be made of metal, plastic, or a combination thereof and/or of other materials, for example, wood. Practical applications for the cart 500 include, but are not limited to, order picking to fulfill purchase orders (e.g., online grocery shopping) from a warehouse or inventory room. The cart 500 has a box-like frame 502 of parallel uprights 504 and horizontal crossbeams 506 rising from a base 508 set on wheels 510. The cart has four wheels 510, one wheel at each corner of the frame's base 508. The wheels 510 can be caster wheels; all four may swivel, or the two front wheels may swivel while the two rear wheels are fixed, or all four may be fixed. The custom design of the cart 500 holds and individually weighs one or more containers 512, which also may be referred to as bins, buckets, or baskets, as described in more detail in connection with FIG. 6.

The frame 502 can be seen to have a front end 514, a midsection 516, and a back end 518, each end or section having a pair of the parallel uprights 504. Instead of being an open-sided frame (i.e., no walls, all four sides open), as shown, other embodiments can have one-sided, two-sided, or three-sided. (A side is generally a wall which subsumes two uprights at opposite ends of the wall; as used herein, the term "vertical member" encompasses walls, sides, posts, and uprights). Each such embodiment has at least one open side to facilitate access into the containers 512. A handle 520 extends from the uprights 504 at the back end 518, by which a person can maneuver the cart.

The frame 502 further includes shelving 522, which operates to compartmentalize the cart into compartments 524 and sub-compartments 526. In this example embodiment, the cart 500 has two compartments 524-1, 524-2; one of the compartments 524-2 has two sub-compartments 526-1, 526-2. Sub-compartments correspond to containers; there can be one container per sub-compartment. Other embodiments of the cart can have fewer or more than two compartments, each with zero, two, or more sub-compartments (a compartment with only one sub-compartment is effectively that compartment; that is, it has no sub-compartments).

Shelves 522 can be an integral piece of the crossbeams 506 (or walls) or be separate pieces fastened across the uprights 504 at the crossbeams 506. Each shelf 522 has a length substantially as wide as the cart 500 and a width designed to support a weighing mechanism (described in connection with FIG. 6) and a region of a container 512 that sits on that shelf. Opposing pairs of shelves 522 extend inwardly into the compartment 524, each shelf of the pair being at the same height from the base 508 as the other shelf. Each pair of opposing shelves 522 supports one container 512. The opposing shelves 522 are a custom distance apart, which corresponds to the width of the container 512 that rests on the two shelves; and the weighing mechanisms on the two shelves together weigh the container 512 placed upon them.

In one embodiment, containers 512 are box-shaped, with a circumferential lip or overhang at the top edge. One side of the container 512 has a sunken, u-shaped border, to facilitate the placing of items into and the taking of items out of the container by hand. The depth of a container may vary: the depth of deep containers is limited, in general, by the size of the compartment; containers having a depth tailored to fit into a sub-compartment 526 allow for multiple containers in a compartment. The containers 512 may be unconnected and removable from the shelves 522 or coupled to the shelves so that they slide out of the open side of the cart along the shelving 522 like desk drawers.

An electronic computing device and display screen (not shown) can be mounted to the frame 502 (e.g., on the handle 520) to compute and display the weight in each container. In one embodiment, the electronic computing device can be remote with respect to the cart (e.g., hand held by an operator using, for example, a hand-held UPC scanner or a smartphone), and the weight sensors can communicate with the computing device wirelessly (e.g., BLUETOOTH®, Wi-Fi, radio signals). Alternatively, because the cart can be used to process multiple shopping orders simultaneously (i.e., each order has its own bin), there can be a display beside each container. A machine-vision system, like that described in connection with FIG. 2, can be integrated into the picker cart, for determining the identity of an item that has been placed in each of the containers 512.

Knowing the weight in each container is useful information towards identifying items or objects as they are placed into that container. For example, in a warehouse picking scenario, where each container holds a different type of item, if it is known that a first type of item that goes into a given container each weighs 8 oz., and there are 3 lbs. of weight in that container, then there are 6 items of that first type in the given container.

In another embodiment, the picker cart 500 comprises a combination of weight sensors that are located on shelving to weigh containers individually, as described in connection with FIG. 5 and FIG. 6, and weight sensors that are located just above the wheels of the cart, below the frame, to weigh the cart in tow, as described in connection with FIG. 3 and FIG. 4.

Figure 6:
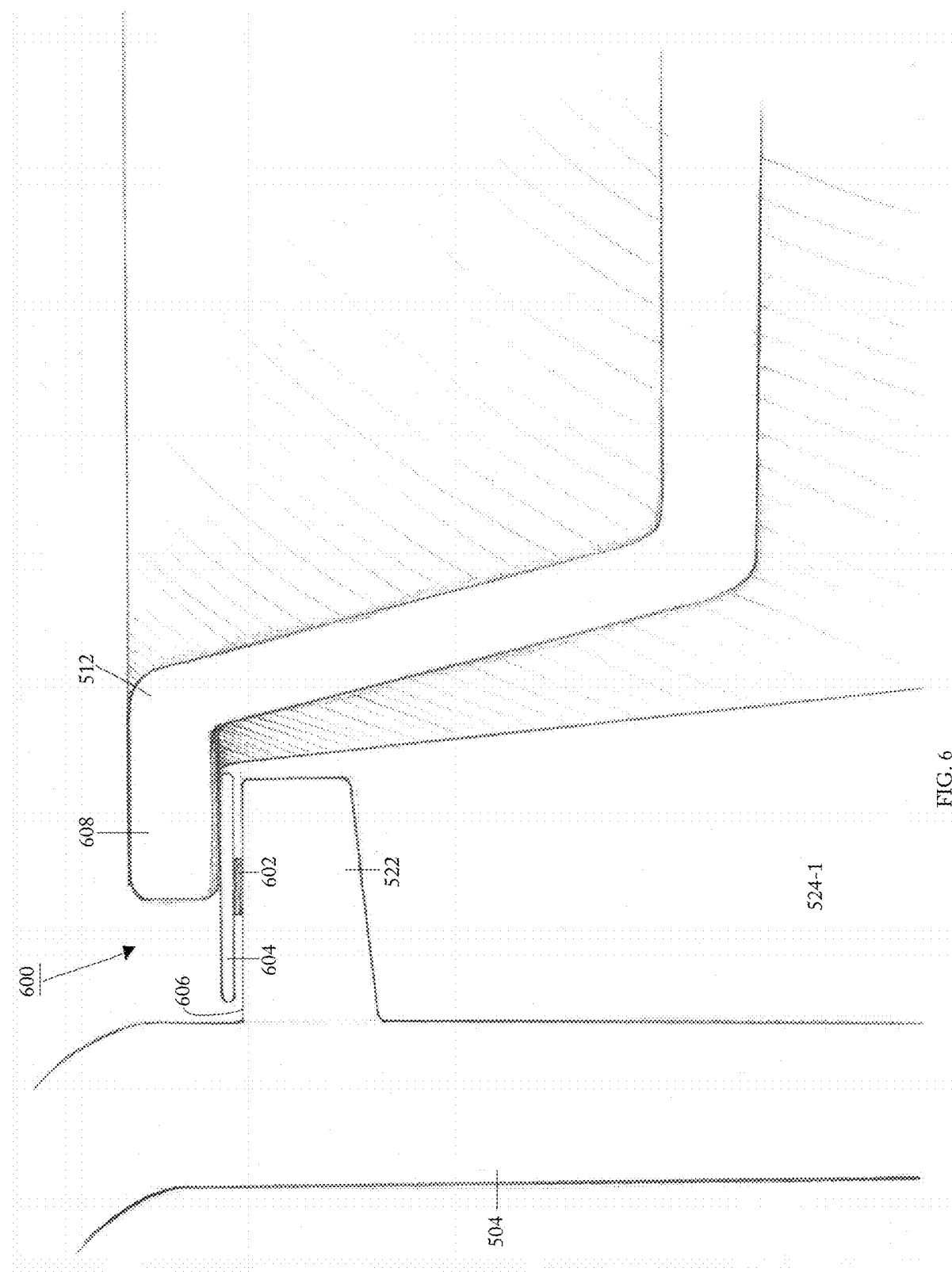
FIG. 6 is a detail view of an embodiment of a mechanism for weighing a basket in the cart of FIG. 5.

FIG. 6 is a detail view of circled region 528 in FIG. 5. The detail view shows an embodiment of a mechanism 600 for weighing a container in the cart 500 of FIG. 5. The weighing mechanism 600 includes a weight sensor 602 sandwiched between a long, thin, floating rail or plate 604 and an upwards-facing or top surface 606 of the shelf 522. The shelf 522 extends inwardly (into the compartment 524-1) from the upright 504. The plate 604 is said to float in that it does not touch the shelf 522 but sits atop the weight sensor or sensors 522 to which it is attached; the plate 604 is spaced apart from the upwards-facing surface 606 of the shelf 522 on account of the weight sensor or sensors 522 disposed in between. In another embodiment, the floating plate 604 can be two separate floating plates (a front section and a back section, separated by a gap in the middle) on the upwards-facing surface 606 of the shelf 522.

In one embodiment, the edge 608 of the container 512 rests on the plate 604. In actuality, edges of the container sit on two plates 604, one on each opposing shelf—there is at least one weight sensor 602 on each of the two opposing shelves 522 that cooperate to weigh items in a container (after determining the tare weight of a given container, all the weight inside the container can be accurately weighed). Another embodiment has weight sensors 602 on the opposing shelves where the corners of the container (i.e., at the front and back edges of each shelf) are expected to rest. This use of four weight sensors enable triangulation of the position of an item put in the container. (Three weight sensors are necessary for triangulation and the fourth provides additional corroborating information). Each weight sensor 602 detects weight change in response to items deposited into or removed from the container 512 and transmits information related to the weight change to the electronic computing device. Wires (not shown) for communicating this information can run through or along the shelving 522 and the frame 502. In another embodiment, a container, for example, a tray, a bucket, or a basket, with a wide enough base (i.e., wide enough to span the distance between two opposing shelves) sits on both plates 604 situated on the opposing shelves on opposite sides of the compartment 524-1. In such an embodiment, the container does not suspend below the plane of the shelves, unlike the container 512 shown in FIG. 6. Further, the shelves 522 can extend from the upright support 504 to the next upright support 516, the weighing plate 604 can span the distance between these two upright supports and merge with its complementary mirror component (not shown), and the weight sensor or weight sensors 602 can weigh a bin placed on the weighing plate 604.

In one embodiment, each weight sensor is load cell about 3 inches in length; the area that the load cell attaches to the weighing plate 604 is about 0.5 inches square. An example of a suitable load cell is the above-described mentioned TAL220 parallel beam load cell, manufactured by HT Sensor Technology Co., Ltd. of Xi'an P.R. China. Other types of weight sensors can be employed without departing from the principles described herein.

As will be appreciated by one skilled in the art, aspects of the present invention may be embodied as a system, method, and computer program product. Thus, some aspects of the present invention may be embodied entirely in hardware, entirely in software (including, but not limited to, firmware, program code, resident software, microcode), or in a combination of hardware and software.

In addition, aspects of the present invention may be in the form of a computer program product embodied in one or more computer readable media having computer readable program code stored thereon. Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include Python, C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, such as the mobile device 140, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet, using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A weighing system comprising:
   a cart comprising:
      a plurality of wheels;
      a frame on the plurality of wheels, the frame having a plurality of rails;
      a basket suspended from the plurality of rails of the frame; and
      a weight sensor coupled at one end to the suspended basket and attached at another end to one of the plurality of rails of the frame from which the basket is suspended, the weight sensor being adapted to detect weight change of the basket when an item is placed into or removed from the basket.

2. The weighing system of claim 1, further comprising a computing device in communication with the weight sensor to receive therefrom information related to the weight change of the basket detected by the weight sensor, the computing device having a processor configured to compute the change in weight of the basket in response to the information.

3. The weighing system of claim 2, further comprising a display screen, and wherein the computing device is configured to display weight information on the display screen in response to receiving the information related to the weight change of the basket detected by the weight sensor.

4. The weighing system of claim 1, wherein the weight sensor is disposed within the frame.

5. The weighing system of claim 4, wherein a first end of the weight sensor is fixed to the frame and a second end of the weight sensor is free-floating and coupled to the suspended basket.

6. The weighing system of claim 1, wherein the frame comprises at least one forward vertical support post.

7. The weighing system of claim 1, further comprising a second weight sensor coupled to the suspended basket and attached to a second one of the rails of the frame from which the basket is suspended.

8. The weighing system of claim 1, further comprising:
a plurality of optical sensors with fields of view that cover the basket; and
a computing device in communication with the plurality of optical sensors, the computing device having a processor configured to receive image or video data from the plurality of optical sensors and to identify an item placed in the basket.

9. The weighing system of claim 1, further comprising attachment means having a first end coupled to the suspended basket and a second end coupled to the weight sensor, thereby to couple the weight sensor to the basket.

10. A weighing system, comprising:
a mobile weighing scale comprising:
a plurality of wheels;
a frame on the plurality of wheels, the frame comprising rails;
a basket, for holding items therein, suspended from the rails of the frame;
a first set of one or more weight sensors, each weight sensor of the first set of one or more weight sensors being fixed between a bottom portion of the frame and a different one of the plurality of wheels, the first set of one or more weight sensors being adapted to detect weight change of the basket when an item is placed into or removed from the basket; and
a second set of one or more weight sensors attached to the rails of the frame from which the basket suspends, and wherein the second set of one or more weight sensors is coupled to the suspended basket to detect a weight change of the basket.

11. The weighing system of claim 10, further comprising a computing device in communication with the first set of one or more weight sensors to receive therefrom information related to the weight change of the basket detected by the first set of one or more weight sensors, the computing device having a processor configured to compute the change in weight of the basket in response to the information.

12. The weighing system of claim 11, further comprising a display screen, and wherein the computing device is configured to display weight information on the display screen in response to receiving the information related to weight change detected by the first set of one or more weight sensors.

13. The weighing system of claim 10, wherein the frame has a base and a plurality of vertical posts supporting the base, and each weight sensor of the first set of one or more weight sensors has a first end and a second end opposite the first end, the first end of each weight sensor of the first set of one or more weight sensors being attached to a different one of the plurality of wheels, and the second end of each weight sensor of the first set of one or more weight sensors being attached to a bottom of a different one of the vertical posts of the frame.

14. The weighing system of claim 10, wherein the frame has a base and a plurality of vertical posts supporting the base, and wherein at least one of the plurality of vertical posts is a forward vertical post.

15. The weighing system of claim 10, wherein the frame has a base and the basket sits directly on the base of the frame.

16. The weighing system of claim 10, further comprising a plurality of optical sensors with fields of view that cover all or a portion of the basket, and wherein the computing device is configured to receive image or video data from the plurality of optical sensors and to identify an item placed in the basket.

17. A weighing system, comprising:
a cart comprising:
a plurality of wheels;
a frame on the plurality of wheels, the frame having spaced apart vertical members, each vertical member having one or more shelves extending horizontally therefrom, a shelf of the one or more shelves of a first vertical member directly opposing a shelf of the one or more shelves of a second vertical member;
a weight sensor attached to a top surface of each of the opposing shelves; and
a floating rail attached to a top surface of each weight sensor, wherein the weight sensors are adapted to detect weight change in a container sitting on the floating rails when an item is placed into or removed from the container.

18. The weighing system of claim 17, further comprising a computing device in communication with each weight sensor to receive therefrom information related to a change in detected sensed by the weight sensors, the computing device having a processor configured to calculate a change in weight of the container in response to the information received from the weight sensors.

19. The weighing system of claim 17, further comprising a second weight sensor, the second weight sensor being fixed between a bottom portion of the frame and one of the plurality of wheels.

* * * * *